(12) United States Patent
Reade et al.

(10) Patent No.: US 7,221,900 B2
(45) Date of Patent: May 22, 2007

(54) JAMMING DEVICE AGAINST RFID SMART TAG SYSTEMS

(75) Inventors: Walter C. Reade, Appleton, WI (US); Daniel L. Ellingson, Appleton, WI (US); Jeff Lindsay, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 562 days.

(21) Appl. No.: 10/301,549

(22) Filed: Nov. 21, 2002

(65) Prior Publication Data

US 2004/0100359 A1 May 27, 2004

(51) Int. Cl.
*H04K 3/00* (2006.01)
(52) U.S. Cl. .................. 455/1; 455/12.1; 455/41.2; 455/161.1; 340/572.3
(58) Field of Classification Search .............. 455/1, 455/12.1, 337, 522, 410, 411, 41.2, 161.1, 455/161.2, 161.3, 552; 340/5.2, 10.2, 572.4, 340/573, 825.49, 10.1, 505, 572.1, 572.2, 340/572.3, 10.51, 928; 710/8; 156/264; 380/239, 7, 26, 34
See application file for complete search history.

(56) References Cited

U.S. PATENT DOCUMENTS

| | | | | |
|---|---|---|---|---|
| 2,885,543 | A | * | 5/1959 | Williams |
| 4,217,550 | A | * | 8/1980 | Blassel et al. .............. 455/1 |
| 4,656,463 | A | | 4/1987 | Anders et al. |
| 5,047,614 | A | | 9/1991 | Bianco |
| 5,164,707 | A | | 11/1992 | Rasmussen et al. |
| 5,361,070 | A | | 11/1994 | McEwan |
| 5,380,991 | A | | 1/1995 | Valencia et al. |
| 5,606,322 | A | * | 2/1997 | Allen et al. .............. 341/173 |
| 5,677,927 | A | | 10/1997 | Fullerton et al. |
| 5,687,169 | A | | 11/1997 | Fullerton |
| 5,727,153 | A | | 3/1998 | Powell |
| 5,832,035 | A | | 11/1998 | Fullerton |
| 5,918,211 | A | | 6/1999 | Sloane |
| 5,942,978 | A | * | 8/1999 | Shafer .............. 340/572.9 |
| 5,955,969 | A | | 9/1999 | D'Hont |
| 6,006,082 | A | * | 12/1999 | Park et al. .............. 455/337 |
| 6,037,879 | A | | 3/2000 | Tuttle |

(Continued)

FOREIGN PATENT DOCUMENTS

DE 29714999 11/1997

(Continued)

OTHER PUBLICATIONS

"Theory, History, and the Advancement of Parametric Loudspeakers: A Technology Overview", by James J. Croft and Joseph O. Norris, Revision D, American Technology Corporation, San Diego, CA 2002. Available at http://www.atcsd.com/pdf/HSSWHTPAPER-RevE.pdf.

Popular Science, What's New, Suzanne Kantra Kirschner, We've heard hypersonic sound. It could change everything. Exemplary applications of hypersonic technology are illustrated at www.popsci.com/popsci/hometech/article/0,12543,351353,00.html.

(Continued)

*Primary Examiner*—Lana Le
*Assistant Examiner*—Tuan H. Nguyen
(74) *Attorney, Agent, or Firm*—Dority & Manning (57) ABSTRACT

A RFID jamming device and methodology are provided for inhibiting unwanted intrusions of RFID smart tag technology. The device includes a mechanism for actively or passively preventing a RFID scanner from accurately receiving information from smart tags associated with products.

5 Claims, 3 Drawing Sheets

U.S. PATENT DOCUMENTS

| | | | |
|---|---|---|---|
| 6,112,052 A * | 8/2000 | Guthrie et al. | 455/1 |
| 6,177,903 B1 | 1/2001 | Fullerton et al. | |
| 6,195,006 B1 | 2/2001 | Bowers et al. | |
| 6,218,979 B1 | 4/2001 | Barnes et al. | |
| 6,226,619 B1 | 5/2001 | Halperin et al. | |
| 6,249,227 B1 | 6/2001 | Brady et al. | |
| 6,354,493 B1 | 3/2002 | Mon | |
| 6,386,450 B1 | 5/2002 | Ogasawara | |
| 6,407,665 B2 | 6/2002 | Maloney | |
| 6,409,086 B1 | 6/2002 | Pellaumail et al. | |
| 6,429,768 B1 * | 8/2002 | Flick | 340/5.2 |
| 6,429,786 B1 * | 8/2002 | Flick | 340/5.2 |
| 6,435,407 B1 | 8/2002 | Fiordelisi | |
| 6,446,049 B1 | 9/2002 | Janning et al. | |
| 6,451,154 B1 | 9/2002 | Grabau et al. | |
| 6,491,217 B2 | 12/2002 | Catan | |
| 6,497,656 B1 | 12/2002 | Evans et al. | |
| 6,587,835 B1 | 7/2003 | Treyz et al. | |
| 6,636,721 B2 * | 10/2003 | Threadgill et al. | 455/12.1 |
| 6,640,214 B1 | 10/2003 | Nambudiri et al. | |
| 6,690,796 B1 * | 2/2004 | Farris et al. | 380/239 |
| 6,693,511 B1 | 2/2004 | Seal | |
| 6,693,539 B2 | 2/2004 | Bowers et al. | |
| 6,694,177 B2 | 2/2004 | Eggers et al. | |
| 6,707,376 B1 | 3/2004 | Patterson et al. | |
| 6,707,381 B1 | 3/2004 | Maloney | |
| 6,768,419 B2 * | 7/2004 | Garber et al. | 340/572.4 |
| 2002/0038392 A1 * | 3/2002 | De La Guerga | 710/8 |
| 2002/0040321 A1 | 4/2002 | Nicholson | |
| 2002/0065680 A1 | 5/2002 | Kojima et al. | |
| 2002/0070862 A1 | 6/2002 | Francis et al. | |
| 2002/0158751 A1 * | 10/2002 | Bormaster | 340/10.2 |
| 2003/0136503 A1 * | 7/2003 | Green et al. | 156/264 |
| 2005/0130687 A1 * | 6/2005 | Filipovic et al. | 455/522 |
| 2005/0242196 A1 * | 11/2005 | Stewart et al. | 235/487 |

FOREIGN PATENT DOCUMENTS

| | | |
|---|---|---|
| DE | 19742126 | 3/1999 |
| WO | 0169429 A2 | 9/2001 |
| WO | 0215073 | 2/2002 |
| WO | 0215073 A1 | 2/2002 |
| WO | 0248955 A1 | 6/2002 |
| WO | 02080060 | 10/2002 |
| WO | 02080060 A1 | 10/2002 |
| WO | 0065532 A1 | 11/2002 |

OTHER PUBLICATIONS

D. McFarlane, "Auto-ID Based Control," White Paper for the Auto-ID Centre Institute for Manufacturing, University of Cambridge, Cambridge, United Kingdom, Feb. 1, 2002. Available at http//www.autoidcenter.org/research/CAM-AUTOID-WH-004.pdf.

Chien Yaw Wong, "Integration of Auto-ID Tagging System with Holonic Manufacturing Systems," White Paper for the Auto-ID Centre Institute for Manufacturing, University of Cambridge, Cambridge, United Kingdom, Sep. 2001. Available at www.autoidcenter.org/research/CAM-WH-001.pdf.

Wincor Nixdorf, Member of METRO Group, Future Store Initiative, "Store Vision—High-Tech for the Future in Retail," Wincor Vision May 2003. Available at http:/www.wincor-nixdor.com/internet/com/Idustries/Retail/WincorVision/WincorVisionSpezialFSI,templateId=blob.jsp.property=Data.pdf.

AMSKAN Editorials, RFID Overview: The science of evaluating RFID (Radio Frequency Identification) Technology, AMSKAN Update: Jan. 1999. Available at www.amskan.com/html/rfid_overview.html.

Ludwig Wiemann and Junru Wu Transdermal Drug Delivery by Sono-Macroporation http://ultra-sonictechnologies.com/cancun-presentation.htm Nov. 4, 2003 11:28:14 AM.

Advertisement—WWW.MOBILECLOAK.COM—mCloak—RFID Tolltags Etc., Copyrighted—2002.

Advertisement—WWW.MOBILECLOAK.COM—RFID Tags, Copyrighted—2002.

Ultra-Wideband Technology for Short- or Medium-Range Wireless Communications, Copyrighted–2001 Intel Corporation.

Ultra Wideband: The Ultimate Disruptive Technology, WWW.ULTRAWIDEBANDPLANET.COM—Jun. 11, 2002—Int Media Group.

U.S. Approves Ultra-Wideband Technology, WWW.WIRELESSNEWSFACTOR.COM—Feb. 15, 2002.

New Public Safety Applications and Broadband Internet Access Among Uses Envisioned by FCC Authorization of Ultra-Wideband Technology, Federal Communications Commision—Feb. 14, 2002.

Ultra Wideband—SEARCHNETWORKING.COM, Copyrighted 2000-2002—Techtarget.

Internet Article—WWW.TIMEDOMAIN.COM-PulsON Technology Capabilities, Sep. 3, 2002.

White Paper—Integration of Auto-ID Tagging System With Holonic Manufacturing Systems—Cambridge University Auto-ID Center, Published Sep. 1, 2001.

Auburn University—Detection & Food Safety Center—AUDFS.ENG.AUBURN.EDU, Sep. 4, 2002.

Internet Article—Smart Tags Indicate Freshness—COURSES.CHE.UMN.EDU, Sep. 4, 2002.

Internet Article—WWW.AIMGLOBAL.ORG—Pharmaceutical Distributor Cuts Day of Safety Stock, Aug. 29, 2002.

Internet Article WWW.IDTECHEX.COM—Independent Market, Strategic and Technology Reports, Aug. 29, 2002.

Internet Article—WWW.READYREALSINFO.COM—M&S Pilots RFID System for Fresh Food Operation, Sep. 4, 2002.

Internet Article—AUDFS.ENG.AUBURN.EDU—Auburn University Detection & Food Safety Center, Sep. 4, 2002.

RFID Journal—Internet Article—WWW.RFIDJOURNAL.COM—Auto-ID Center Opens Demonstration Lab in the U.K., Sep. 4, 2002.

Internet Article—WWW.AUTOIDCENTER.ORG—Transmitting ePC Codes, Aug. 26, 2002.

Internet Article—WWW.ELECTRONICIDINC.COM—Destron-Fearing Electronic ID Background, Sep. 4, 2002.

Internet Article—DESTRONFEARING.COM—Applications-Companion Animals, Sep. 4, 2002.

Internet Article—AUDFS.ENG.AUBURN.EDU—Auburn University—Detection & Food Safety Center.

Internet Article—SFGATE.COM—Shops Try Chips for Tracking Every Move by Client 'Tribe' Monitoring Systems Note What Catches Customers' Eyes, Aug. 6, 2002.

Internet Article—WWW.AIMGLOBAL.ORG—Radio Frequency Identification—RFID a Basic Primer, Sep. 28, 1999.

Internet Article—WWW.AIMGLOBAL.ORG—Common Applications—RFID, Jul. 23, 2002.

Internet Article—WWW.USATODAY.COM—New Chips Could Make Everyday Items 'Talk', Jul. 23, 2002.

Forbes Magazine—The Internt of Things, Mar. 18, 2002.

Auto-ID Center—Institute for Manufacturing, University of Cambridge—White Paper—Auto-ID Based Control—An Overview, Feb. 1, 2002.

Wireless Handhelds—Beam Up Some Information, Scotty, Control Engineering, May 2002.

Scientific American—Wireless Data Blaster, May 2002.

Auto-ID Center, Institute for Manufacturing, University of Cambridge, White Paper—The Intelligent Product Driven Supply Chain, Feb. 1, 2002.

Auto-ID Center Massachusetts Institute of Technology—White Paper—Smart Medicine—The Application of Auto-ID Technology to Healthcare, Feb. 1, 2002.

U.S. Appl. No. 10/301,513, filed Nov. 21, 2002.
U.S. Appl. No. 10/301,879, filed Nov. 21, 2002.
U.S. Appl. No. 10/301,882, filed Nov. 21, 2002.
U.S. Appl. No. 10/301,877, filed Nov. 21, 2002.
U.S. Appl. No. 10/301,846, filed Nov. 21, 2002.
U.S. Appl. No. 10/301,883, filed Nov. 21, 2002.

* cited by examiner

JAMMING DEVICE AGAINST RFID SMART TAG SYSTEMS

TECHNICAL FIELD OF THE INVENTION

The present invention relates generally to the field of RFID technology, and more particularly to a jamming device against RFID systems.

BACKGROUND

Radio Frequency Identification Devices (RFIDs) are low-cost, passive "smart" chips or "tags" that can be embedded in or attached to articles, products, and the like to convey information about the product via a scanner. The smart tags are generally small label-like devices with a microchip and a miniature embedded antennae. The tags may be passive or active, the active tags requiring an internal power supply. A reader or scanner interrogates the smart tag with an electronic "trigger" signal. The tag in turn generates an electromagnetic pulse response that is readable by the scanner, the response containing the product information. RFID smart tags can be embedded in or attached to product packaging, or incorporated directly into the product, and may convey conventional "bar code" information, as well as other more detailed information.

Various commercial applications have been suggested for smart tags, particularly in the area of retail marketing and sales. For example, RFID technology may be used to gather information related to consumer trends, purchasing habits, consumption rates, etc. It has also been suggested that RFID technology has promise in the areas of inventory control, manufacturing process and control, product accountability and tracking systems, etc. Manufacturers, shippers, and retailers may be able to follow a given product through their respective systems from initial production through to point of sale. It has been suggested that other applications may include shopping carts that automatically charge a bank account, refrigerators that tap into the Internet to automatically reorder items that are running low, and interactive televisions linked to such refrigerators that will feed targeted commercials and special offers to consumers. (See, "They Know What You Eat," by Kayte VanScoy, Smart Business, January 2001).

Although RFID technology may provide benefits to the commercial sector, certain individuals may view particular uses of the technology as intrusive and an invasion of privacy. For example, some consumers refuse to use of "loyalty" cards at supermarkets even if a significant discount is offered because they object to the notion that their purchases are being tracked and analyzed. Such consumers may be less than enthused at the possibility that smart chips or tags embedded in their clothing, for example, may disclose their purchasing habits or likes and dislikes when they walk past a smart tag scanner at the entrance of a store. Consumers may object to being selectively targeted by telemarketers or mass mailings based on the smart tagged products they purchased at a store.

The present invention relates to a novel implementation of jamming devices to inhibit unwanted intrusions of RFID technology.

SUMMARY

Objects and advantages of the invention will be set forth in the following description, or may be obvious from the description, or may be learned through practice of the invention.

The present invention provides a RFID technology jamming system and method to inhibit unwanted intrusions of RFID technology into an individual's personal life. The device and method of the present invention is intended to prevent RFID smart tag systems from detecting and identifying products purchased or worn by an individual, or otherwise associated with or belonging to an individual. A jamming device according to the invention includes means for inhibiting a smart chip RFID scanner or receiver from accurately receiving information from smart tags attached to or within the products associated with or belonging to the individual.

In one particular embodiment, the jamming device comprises a passive device. For example, in one embodiment, the passive device may comprise a structure containing a large volume of RFID chips. When the chips are "excited" by a trigger excitation signal from a nearby scanner, the chips simultaneously generate an electromagnetic response pulse. The number of chips is so great that the scanner is overwhelmed by the response pulses and cannot read the multiple responses rapidly enough and discriminate between these responses and any "legitimate" responses generated by any product smart tags.

In another embodiment, one or more chips are used to emit lengthy codes (e.g. greater than about 500 bits of information) to confuse or overwhelm a scanner. For example, while a conventional smart tag may transmit less than 600 bits of information, such as 128 bits or less, chips with a greater number of bits may be used, such as 1024 bits or 2048 bits, or bit lengths that are greater than about 1000 bits, 2000 bits, 4000 bits, 8000 bits, 16,000 bits, 64,000 bits, 100,000 bits, or in general equal to or greater than $2^N$ where N is any integer greater than 10, such as 15, 17, 25, 31, 63, or 100. In another embodiment, the number of bits in the code emitted by a chip is an odd number, to confuse a scanner seeking to read an even number of bits. Odd bit lengths may be, for example, 31 or greater, 63 or greater, 127 or greater, 1001 or greater, and the like. In one embodiment, the odd number of bits can be expressed as $2^N+M$, where N is any integer equal to or greater than 3, such as 6 or greater, 7 or greater, 8 or greater, 9 or greater, or 10 or greater, and M is a positive or negative odd integer such as plus or minus any of the following: 1, 3, 5, 7, 9,11, 13, 15, 17, and the like, wherein the minimum bit length for odd-bit chips may be any of 3, 7, 13, 27, 31, 63, or 121. Any combination of active chips may be used. For example, a jamming device may comprise, for example, a mixture of over 100 96-bit chips, over 100 32-bit chips, over 100 128-bit chips. 10 512-bit chips, and 5 97-bit chips.

The structure containing the RFID jamming chips is not limited in any manner and, desirably, may be disguised as any type of item typically carried or worn by a consumer. For example, the structure may be configured to look like a cellular telephone, pager, camera, or the like. The passive jamming device may have a size so as to fit within a pocket, purse, briefcase, backpack, belt, pen, button on an item of clothing, a shirt label, a shoe, a dental filling, a wristwatch, and so forth. Ways in which to hide or disguise the passive jamming device will be readily apparent to those of skill in the art.

In an alternate embodiment of the methodology and system according to the invention, the jamming device comprises an active device. In one particular embodiment of the active device, a self-powered RFID transmitter generates random RFID signals in the presence of an RFID scanner. The random RFID frequency signals will have a scrambling effect on the RFID receiver, thereby essentially rendering the receiver ineffective and unable to detect product smart tag signals associated with the individual. The active RFID jammer may be a spot jammer transmitting at select frequencies. Alternatively, the jamming frequencies may be shifted randomly or in a "sweep" sequence controlled by a microprocessor including an ASIC (Application Specific Integrated Circuit). In one embodiment, the signal strength of the active chip is much greater than the significant strength of the smart tags that are to be masked by the jamming device. The degree of signal amplification required to mask a weaker smart tag signal may be determined by routine experimentation, but in one embodiment, the rms amplitude of the active chip's signal may be about 50 times as strong or greater, more specifically about 100 times as strong or greater, and most specifically about 500 times as strong or greater, than the signal strength of a smart tag to be masked, when measured with a conventional scanner at a distance of 10 centimeters.

In another embodiment, an active device is used that emits a significant signal of rapidly changing length or a continuous signal with no readily discernible bit length. Active chips can also be used in combination with passive chips. For example, an active chips that emits random signals and an active chips that emits a continuous signal may be combined with a mixture of passive chips of various bit lengths. Signals from active devices can also be fleeting, such that the signal does not last long enough to be accurately read by the scanner in order to confuse it, yet long enough to repeatedly divert the "attention" of the scanner away from weaker smart tag signals that are to be jammed by the device.

In another embodiment, an active jamming device may emit signals at more than one frequency to confuse a scanner. A rapid sequence of alternating frequencies may be used, or the device can provide two or more simultaneous frequencies such as 2.48 GHz and 13.56 MHz, or a simultaneous burst of two or more frequencies or many frequencies (e.g., a wide band signal).

The active RFID jamming device may be essentially an RFID receiver/transmitter that includes RFID scanning circuitry to detect RFID signals from either the smart tags or RFID scanner For example, when an individual comes within range of an RFID scanner, any product smart tags associated with the individual will be induced by an excitation signal from the scanner to generate a product identification response signal. The jamming device may also detect the smart signals from the tags or the RF signal from the scanner, and transmit a jamming RF signal at a frequency or band to jam the RFID scanner. In one embodiment, the jamming signal may simply be RF noise, and in another embodiment the jamming signal may be a "smart" modulated signal conveying false information, the modulated signals being similar to but distinctly different from the legitimate product smart tag signals.

The active versions of the smart tag jammer may transmit continuously or only in the presence of a scanner in which they are intended to jam. The active transmitters may include detection circuitry that activates the jamming device upon detecting an excitation source or signal from an RFID scanner or from the smart tags. The jamming device may include an alert or alarm to indicate to the individual that they or their products are within range of an RFID scanner.

As with the passive jamming devices, the active jamming devices may be disguised as any typical consumer product, such as an electronic product, and the like, or may be of a size so as to fit discretely within a pocket, purse, briefcase, backpack, and the like.

In another embodiment, the jamming device can be activated or deactivated at the will of the user to prevent others from scanning smart tags except under certain circumstances. For example, some users of smart cards containing personal and financial information may fear that others may use scanners to obtain their personal information (e.g., account numbers and access codes). Such smart cards can be protected with a jamming device that is turned off when the smart card is to be used by a legitimate scanner. Active jamming devices may simply have the power turned off or disconnected. Passive jamming devices may employ antennas that can be disabled or disconnected by actions such as squeezing or bending a flexible card, pulling a tab, pressing a button, and the like, or the passive jamming device may be shielded by a Faraday cage, a metal cover, or a layer of dense material such as concrete, or may simply be removed from the presence of the smart card or other objects comprising smart tags when the user wishes to allow the smart tags to be scanned. For example, an automated teller at a bank adapted to read smart tags in a smart card may be equipped with a shielding device into which a jamming device can be temporarily placed to prevent jamming, or there may be removal means such as a pneumatic tube or conveyor system to momentarily allow the jamming device to be carried a distance away from a smart tag reader to prevent jamming.

Additional aspects of the present methodology and system will be described below with reference to the figures.

DETAILED DESCRIPTION

Reference will now be made in detail to one or more embodiments of the invention, examples of which are graphically illustrated in the drawings. Each example and embodiment are provided by way of explanation of the invention, and not meant as a limitation of the invention. For example, features illustrated or described as part of one embodiment may be utilized with another embodiment to yield still a further embodiment. It is intended that the present invention include these and other modifications and variations.

RFID smart tag technology is known and understood by those skilled in the art, and a detailed explanation thereof is not necessary for purposes of describing the method and system according to the present invention. A typical smart tag detection configuration is depicted generally in FIG. 1. Conductive or passive micro memory chips ("smart tags") 14 may consist of a microchip comprising silicon or other semiconductors, a coiled, etched, or stamped antennae, a capacitor, and a substrate on which the components are mounted or embedded. A protective covering is typically used to encapsulate and seal the substrate. Inductive or passive smart tags have been introduced by Motorola under the name "BiStatix". A detailed description of the BiStatix device may be found in U.S. Pat. No. 6,259,367 B1, incorporated herein by reference in its entirety for all purposes. Another commercial source of suitable smart tags is Alien Technology Corporation of Morgan Hill, Calif., under the technology name FSA (Fluidic Self-Assembly). With the FSA process, tiny semi-conductor devices are assembled into rolls of flexible plastic. The resulting "smart" substrate can be attached to or embedded in any variety of products. The smart tag technology under development at the Auto-ID Center at Massachusetts Institute of Technology (Cambridge, Mass.) can also be used within the scope of the present invention. Further information on smart tags and related technology is disclosed in U.S. Pat. No. 6,451,154, "RFID Manufacturing Concepts," issued Sep. 17, 2002 to Grabau et al.; U.S. Pat. No. 6,354,493, "System and Method for Finding a Specific RFID Tagged Article Located in a Plurality of RFID Tagged Articles," issued Mar. 12, 2002 to Mon; PCT publication WO 02/48955, published Jun. 20, 2002; U.S. Pat. No. 6,362,738, "Reader for Use in a Radio Frequency Identification System and Method," issued Mar. 26, 2002 to Vega; D. McFarlane, "Auto-ID Based Control," White Paper for the Auto-ID Centre Institute for Manufacturing, University of Cambridge, Cambridge, United Kingdom, Feb. 1, 2002, available at http://www.autoidcenter.org/research/CAM-AUTOID-WH-004.pdf; and Chien Yaw Wong, "Integration of Auto-ID Tagging System with Holonic Manufacturing Systems," White Paper for the Auto-ID Centre Institute for Manufacturing, University of Cambridge, Cambridge, United Kingdom, September 2001, available at www.autoidcenter.org/research/CAM-WH-001.pdf.

Other examples of commercial RFID systems include those marketed by Microchip Technologies (Chandler, Ariz.); the I*CODE chips and readers of Philips Semiconductor (Eindhoven, The Netherlands); the RFID products of Sokymat (Lausanne, Switzerland); the TI*RFID™ Systems and Tag It™ chips of Texas Instruments (Dallas, Tex.); and the products of Gemplus (Gemenos, France), Nedap (Groenlo, The Netherlands), Checkpoint Systems Inc. (Miami, Fla.), and Omron Company (Tokyo, Japan). High frequency bands can be used, exemplified by the 2.45 GHz products of SCS Corporation (Rancho Bernardo, Calif.

A related technology within the scope of the present invention is Surface Acoustic Wave (SAW) technology. For example, InfoRay (Cambridge, Mass.) markets a passive smart tag that is said to achieve long ranges (up to 30 meters) using a Surface Acoustic Wave (SAW) device. On a chip coupled with an antenna. The SAW device converts a radio signal to an acoustic wave, modulates it with an ID code, then transforms it to another radio signal that is emitted by the smart tag and read by a scanner. The ID code of the smart tag is extracted from the radio signal. The scanner is said to compare the spectral content of the signal with a database of signatures and to derive the ID code. This method enables a read range of up to 30 m (typical 10-20 m). The system can operate in the 915 MHz band and 2.45 GHz band. RFSAW, Inc. (Dallas, Tex.) also provides minute Surface Acoustic Wave (SAW) RFID devices that can be used within the scope of the present invention. Smart tags can include read-write systems or write-only systems.

Figure 1:
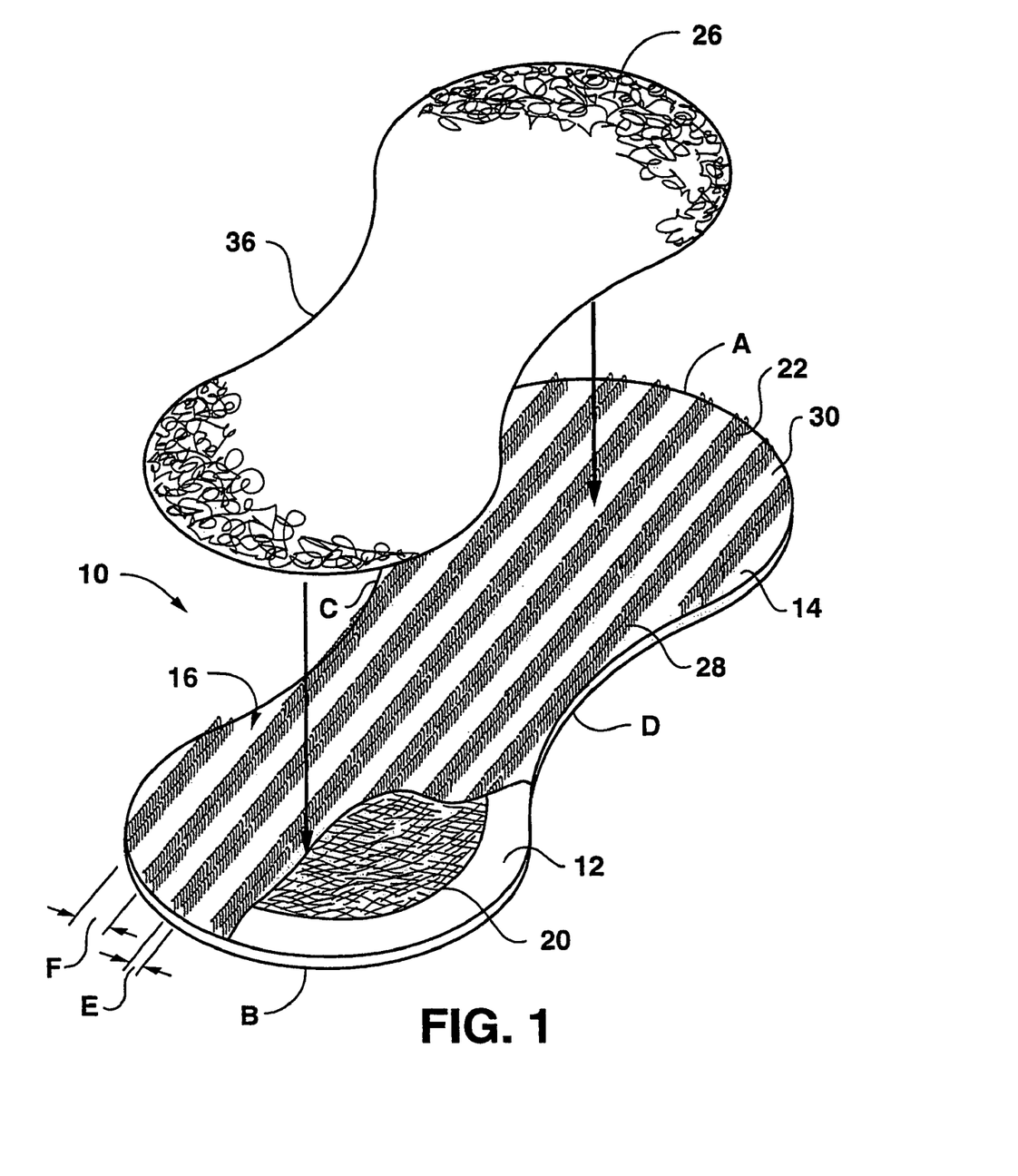
FIG. 1 is a graphic illustration of concepts according to a method and system of the invention.

An embedded antennae within the smart tags 14 can be a useful component of the device, though it is recognized that alternatives to antennas may exist in some applications. For example, for some metallic objects, the smart tag need not comprise an antenna but the metallic object itself can serve as the antenna. An excitation trigger signal 18 from a RFID scanner 16 must be received by the antennae to "activate" the smart tag 14. The received excitation signal 18 is the power source for the smart tag 14 and results in the generation of an electromagnetic pulse containing a coded product information signal 20. A detailed description of RFID smart tag antennas and technology may also be found in U.S. Pat. No. 6,320,556 B1, incorporated herein by reference for all purposes.

For commercial applications, an RFID scanner must be able to read multiple signals from a plurality of smart tags and to discriminate and focus only on the signals of interest. The problem of RFID scanners encountering multiple signals has been recognized in the art. Anti-collision algorithms may be used to sort through multiple signals, but such systems have limitations. It is unlikely that RFID scanners can be reasonably equipped to process large numbers of simultaneous RFID signals, such as about 1,000 or more, or 10,000 or more simultaneous signals. It is also unlikely from a commercial feasibility standpoint to equip RFID scanners with processing circuitry necessary to effectively handle the complexities created by active signal jamming that confuses the scanner with transient random signals, spot frequency jamming, or broadband barrage jamming. These inherent drawbacks of smart tag scanners can be exploited for purposes of creating effective jamming techniques.

As mentioned, FIG. 1 graphically illustrates a typical smart tag detection system wherein smart tags 14 are attached or embedded in any manner of articles 12. A smart tag scanner 16 is disposed at a location to detect and interrogate products associated with smart tags 14 coming within range of the scanner 16. For example, the scanner 16 may be disposed at the exit or entrance to a store, departments within the store, checkout counters, etc. In the illustrated scenario, the scanner 16 is disposed so as to detect the types of products or articles a consumer has purchased in a particular department, or is actually wearing in the case of embedded smart tags 14 in the consumer's clothes, etc. The scanner 16 may be operationally configured with any manner of computer network (graphically illustrated as computer 20) wherein the received and decoded product information signals are processed and analyzed for any number of reasons. Still referring to FIG. 1, the consumer may carry on their person a jamming device 30 in accordance with the present invention to inhibit the scanner 16 from effectively detecting smart tags 14 in any products purchased or otherwise associated with the consumer.

Figure 2:
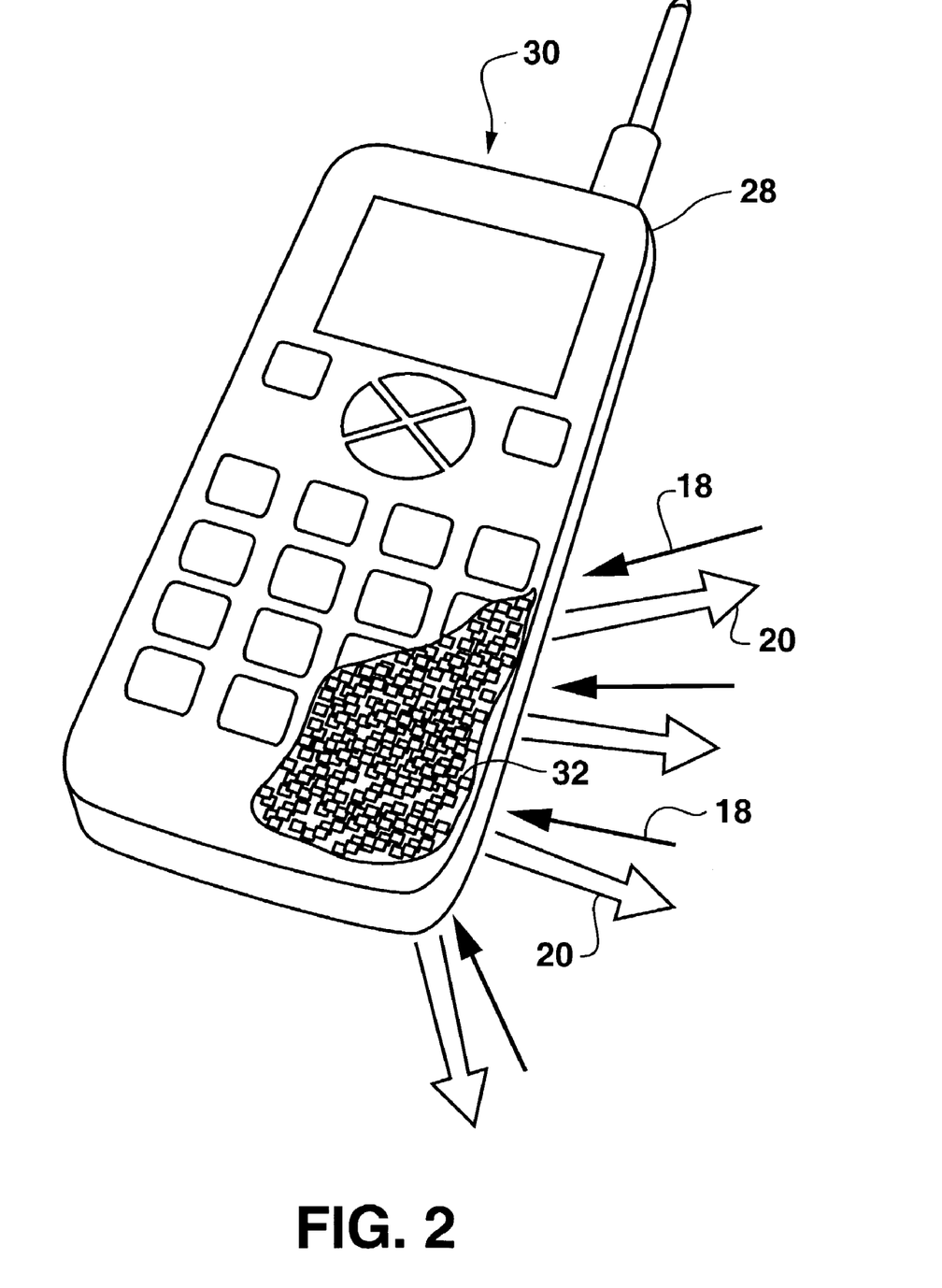
FIG. 2 is a graphic illustration of a passive RFID jamming device according to the invention.

FIG. 2 is a graphic representation of a passive RFID jamming device 30 in accordance with the teachings of the invention. The device 30 may be disguised as any conventional item or article that is typically and inconspicuously associated with consumers. For example, in the illustrated embodiment, the device 30 includes a structure 28 disguised as a conventional cellular telephone. This is for illustrative purposes only. The structure 28 may be disguised, for example, as any manner of consumer electronic item, such as a pager, camera, personal CD player, radio, etc. In an alternate embodiment, it is not necessary that the scanner 30 actually be visible. The jamming device 30 may be of a size and proportion so as to discretely fit within the individual's pocket, purse, briefcase, backpack, and the like.

Still referring to FIG. 2, the structure 28 defines an interior volume in which a plurality of RFID chips 32 are stored. The number of chips may vary, but should be great enough so as to generate a sufficient number of random RFID signals to overwhelm the RFID scanner 16. The number of chips and signals will obviously vary depending on the type of RFID system and such number may be empirically determined. The present inventors contemplate that 10,000 or greater chips may be sufficient to render current RFID scanner technology ineffective. However, it should be recognized that this number may be greater or larger depending on the RFID system.

Referring to FIG. 1, as the consumer 30 approaches or comes within range of the scanner 16, the scanner's excitation trigger signals 18 "excite" or activate the plurality of jamming chips 32 causing each chip 32 to transmit an electromagnetic pulse signal 20. The plurality of pulse signals 20 are received by the scanner 16 and are of such a large number so as to prevent the scanner 16 from effectively detecting or recognizing legitimate product information signals 20 transmitted by any product associated smart tags 14.

In an alternative embodiment, the jamming or inhibiting means used in the jammer 30 may comprise an active device. When a large volume of tags must be read together in the same RF field, the system (system—RFID tag and the scanner) must have the ability to avoid collisions. Typically such is accomplished by having the RFID tags transmit at different times. This is accomplished by having each tag, after being activated, generate a random number and then count down from the random number to zero before transmitting data. Theoretically, the tags would use different random numbers and thus would transmit at different times.

With an active jamming system, a transmitter may be used to transmit RF "garbage" over the detected RF envelope (or frequency spectrum used by various RFID systems) as soon as a RF field transmitted by either a scanner or an RFID tag is detected. The jamming transmitter would transmit for a set period of time.

In one embodiment, at least one signal from the jamming device is delayed relative to the trigger signal sent by the scanner. The lag time between the trigger signal and the delayed returned signal can vary automatically in length. Capacitors and other known devices (including LCR circuits) can be used with passive jamming devices to delay the returned signal.

Figure 3:
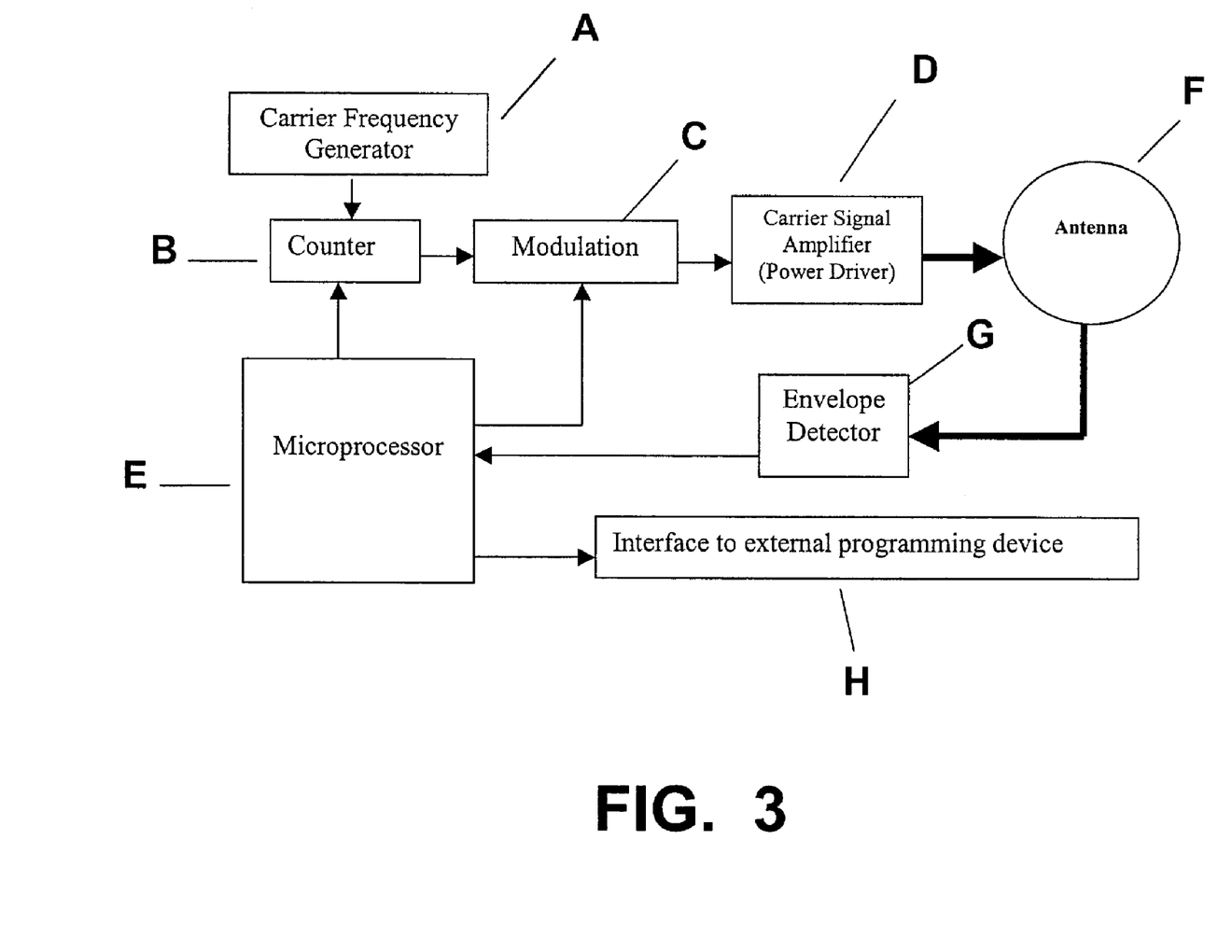
FIG. 3 is a schematic block diagram of a representative active RFID jamming device according to the invention.

A block diagram an embodiment of a jamming circuit is provided in FIG. 3. A carrier frequency is generated by a carrier frequency generator A which may be, for example, a crystal oscillator clock signal generator. A binary counter B is used to divide the clock signal down to a desired carrier frequency. For example, if the clock signal is at 4 MHz and it is desired to jam at a frequency of 125 kHz, the counter B is set to a value of 32 (4 MHz/32=125 kHz). The counter value may be programmable to allow jamming at random frequencies. A counter value generated by a random number generator would jam at random frequencies. The counter value may be programmed to jam at all frequencies by sweeping the jammer signal (stepping up or down in sequence).

The jammer may include an Application Specific Integrated Circuit (ASIC) microprocessor E that is activated by a signal from an envelope detector G. The ASIC would then generate random numbers which would be used as the counter values for the counter B. The random numbers would have a maximum and minimum value. For example, if one wanted to jam over a frequency spectrum of 300 KHz to 50 KHz, the random numbers would be between 13 and 80. A short delay would be required between the reprogramming of the counter value to allow for transmitting the jamming signal. The ASIC E would also provide the modulation information to a modulator C (if incorporated in the circuit).

As mentioned, another effective jamming method would be to just "sweep" the frequency spectrum of interest. For example, if one wanted to jam over a spectrum of 300 kHz to 50 kHz, instead of using random numbers, the counter value is sequentially decremented or incremented (after a short delay). For example, for a 4 MHz clock (to jam from 50 kHz to 300 kHz), the counter may be started at 13 and increase by a "step value" until the upper counter value limit (for this example, 80) is reached. The process then repeats over and over.

A modulator C may be provided in a more sophisticated jamming circuit. Modulation may be provided to generate "false information", and not just "jam" the RFID scanner.

An envelope detector G may be provided to trigger the ASIC E upon receiving a signal for either the RFID tag or the RFID scanner.

A carrier signal amplifier D is provided to sufficiently boost the jamming signal to a desired level prior to transmission.

An antenna F is provided to receive a detected RFID tag or scanner signal, and to subsequently transmit the jamming signal. The antenna F should be capable of transmitting a signal of sufficient strength over the frequency spectrum that one wishes to jam. Such antenna would be tuned to the center frequency of the spectrum and would be used for transmitting and receiving. For example, if one wished to jam over a spectrum of 100 kHz to 150 kHz, the antenna would be tuned to 125 kHz.

The RFID jamming device may also be capable of communicating with an external device through an interface H. Such an external device could be used to reprogram firmware within the processor to add functionality or jamming features to be developed in the future.

As with the passive jamming device 30, the active jamming device 30 may also be disguised as any manner of conventional consumer good, such as an electronic article, and the like. Alternatively, the active jamming device 30 may be of a size and configuration so as to discretely fit within an individual's pocket, purse, backpack, briefcase, or the like.

It should be appreciated that the RFID jamming system and methodology according to the invention is not limited to any particular scenario. The jamming device may be used wherever an individual desires to inhibit smart tag technology from intruding into the individual's private life.

It should be appreciated by those skilled in the art that the system and method according to the invention have wide applications, and that the example and embodiments set forth herein are merely exemplary. It is intended that the present invention include such uses and embodiments as come within the scope and spirit of the appended claims.

What is claimed is:

1. A jamming device for inhibiting unwanted intrusions of RFID smart tag technology, said device comprising means for inhibiting smart chip RFID scanners from accurately receiving information from smart tags associated with products, wherein said inhibiting means comprises a passive device, and wherein said passive device comprises a structure containing a sufficient number of RFID chips so as to overwhelm a RFID scanner with simultaneous RFID signals to an extent that the scanner cannot process such signals.

2. The device as in claim 1, wherein said structure comprises at least about 1,000 RFID chips.

3. The device as in claim 1, wherein said structure comprises at least about 10,000 RFID chips.

4. The device as in claim 1, wherein said structure is disguised as a consumer electronic device.

5. The device as in claim 1, wherein said structure is of a size so as to fit within one of a pocket, purse, briefcase, and backpack.

* * * * *

UNITED STATES PATENT AND TRADEMARK OFFICE
CERTIFICATE OF CORRECTION

| | | |
|---|---|---|
| PATENT NO. | : 7,221,900 B2 | Page 1 of 3 |
| APPLICATION NO. | : 10/301549 | |
| DATED | : May 22, 2007 | |
| INVENTOR(S) | : Reade et al. | |

It is certified that error appears in the above-identified patent and that said Letters Patent is hereby corrected as shown below:

The title page showing the illustrative figure should be deleted to be replaced with the attached title page.

The drawing sheet, consisting of Fig. 1, should be deleted to be replaced with the drawing sheet, consisting of Fig. 1, as shown on the attached page.

Signed and Sealed this

Second Day of June, 2009

JOHN DOLL
*Acting Director of the United States Patent and Trademark Office*

(12) United States Patent
Reade et al.

(10) Patent No.: US 7,221,900 B2
(45) Date of Patent: May 22, 2007

(54) JAMMING DEVICE AGAINST RFID SMART TAG SYSTEMS

(75) Inventors: Walter C. Reade, Appleton, WI (US); Daniel L. Ellingson, Appleton, WI (US); Jeff Lindsay, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 562 days.

(21) Appl. No.: 10/301,549

(22) Filed: Nov. 21, 2002

(65) Prior Publication Data

US 2004/0100359 A1    May 27, 2004

(51) Int. Cl.
*H04K 3/00* (2006.01)
(52) U.S. Cl. .............. 455/1; 455/12.1; 455/41.2; 455/161.1; 340/572.3
(58) Field of Classification Search ............ 455/1, 455/12.1, 337, 522, 410, 411, 41.2, 161.1, 455/161.2, 161.3, 552; 340/5.2, 10.2, 572.4, 340/573, 825.49, 10.1, 505, 572.1, 572.2, 340/572.3, 10.51, 928; 710/8; 156/264; 380/239, 7, 26, 34

See application file for complete search history.

(56) References Cited

U.S. PATENT DOCUMENTS

| 2,885,543 | A | * | 5/1959 | Williams |
|---|---|---|---|---|
| 4,217,550 | A | * | 8/1980 | Blassel et al. ............ 455/1 |
| 4,656,463 | A | | 4/1987 | Anders et al. |
| 5,047,614 | A | | 9/1991 | Bianco |
| 5,164,707 | A | | 11/1992 | Rasmussen et al. |
| 5,361,070 | A | | 11/1994 | McEwan |
| 5,380,991 | A | | 1/1995 | Valencia et al. |
| 5,606,322 | A | * | 2/1997 | Allen et al. ............ 341/173 |
| 5,677,927 | A | | 10/1997 | Fullerton et al. |
| 5,687,169 | A | | 11/1997 | Fullerton |
| 5,727,153 | A | | 3/1998 | Powell |
| 5,832,035 | A | | 11/1998 | Fullerton |
| 5,918,211 | A | | 6/1999 | Sloane |
| 5,942,978 | A | * | 8/1999 | Shafer ............ 340/572.9 |
| 5,955,969 | A | | 9/1999 | D'Hont |
| 6,006,082 | A | * | 12/1999 | Park et al. ............ 455/337 |
| 6,037,879 | A | | 3/2000 | Tuttle |

(Continued)

FOREIGN PATENT DOCUMENTS

DE    29714999    11/1997

(Continued)

OTHER PUBLICATIONS

"Theory, History, and the Advancement of Parametric Loudspeakers: A Technology Overview", by James J. Croft and Joseph O. Norris, Revision D, American Technology Corporation, San Diego, CA 2002. Available at http://www.atcsd.com/pdf/HSSWHTPAPER-RevE.pdf.

Popular Science, What's New, Suzanne Kantra Kirschner, We've heard hypersonic sound. It could change everything. Exemplary applications of hypersonic technology are illustrated at www.popsci.com/popsci/hometech/article/0,12543,351353,00.html.

(Continued)

*Primary Examiner*—Lana Le
*Assistant Examiner*—Tuan H. Nguyen
(74) *Attorney, Agent, or Firm*—Dority & Manning (57) ABSTRACT

A RFID jamming device and methodology are provided for inhibiting unwanted intrusions of RFID smart tag technology. The device includes a mechanism for actively or passively preventing a RFID scanner from accurately receiving information from smart tags associated with products.

5 Claims, 3 Drawing Sheets

FIG. 1

FIG. 1